(12) United States Patent
Dengler et al.

(10) Patent No.: US 12,346,398 B1
(45) Date of Patent: Jul. 1, 2025

(54) VISUAL FILTERING SYSTEM AND METHOD

(71) Applicant: Demand Science Group, LLC, Danvers, MA (US)

(72) Inventors: Nicolas Dengler, Danvers, MA (US); Iskander Pols, Danvers, MA (US)

(73) Assignee: DEMAND SCIENCE GROUP, LLC, Danvers, MA (US)

( * ) Notice: Subject to any disclaimer, the term of this patent is extended or adjusted under 35 U.S.C. 154(b) by 0 days.

(21) Appl. No.: 18/605,318

(22) Filed: Mar. 14, 2024

Related U.S. Application Data

(60) Provisional application No. 63/452,759, filed on Mar. 17, 2023.

(51) Int. Cl.
*G06F 16/00* (2019.01)
*G06F 16/957* (2019.01)

(52) U.S. Cl.
CPC .................. *G06F 16/9577* (2019.01)

(58) Field of Classification Search
CPC .... G06F 9/451; G06F 3/0483; G06F 16/9535; G06F 16/954; G06F 16/957; G06F 3/0482; G06F 16/9538; G06F 16/9558; G06F 16/9562; G06F 16/958; G06F 3/0481; G06F 3/04842; G06F 3/04847; G06F 9/453; G06F 3/165
See application file for complete search history.

(56) References Cited

U.S. PATENT DOCUMENTS

| | | | |
|---|---|---|---|
| 7,587,679 | B1 | 9/2009 | Sundermeyer et al. |
| 11,361,373 | B1 | 6/2022 | Warren et al. |
| 11,507,992 | B1 | 11/2022 | Leveau et al. |
| 2022/0365639 | A1 | 11/2022 | Hawkins et al. |

OTHER PUBLICATIONS

U.S. Appl. No. 60/604,826, filed Aug. 25, 2004, Sundermeyer et al.
U.S. Appl. No. 62/714,288, filed Aug. 3, 2018, Leveau.

*Primary Examiner* — Shyue Jiunn Hwa
(74) *Attorney, Agent, or Firm* — Manatt, Phelps & Phillips, LLP

(57) ABSTRACT

A visual filtering system and method provides an overview of the search landscape while the user is performing a search. The visual filtering allows the user to see the tentative results of a new search filter (and how many search results will be matching) before the user implements the new search filter. The visual filtering system may be implemented in part using a browser extension/plug-in.

14 Claims, 20 Drawing Sheets

| Contacts 1,267 | Companies 106 | Data Profile | | |
|---|---|---|---|---|
| > | | | | |
| ☐ Capital One | Banking/Accounting/Financial | Nottingham, Nottinghamshire, United Kingdom | 5000+ employees >1B | ... |
| ☐ ANZ | Banking/Accounting/Financial | Stranraer, Wigtownshire, United Kingdom | 5000+ employees >1B | ... |
| ☐ American Express | Banking/Accounting/Financial | Rueil Malmaison, Hauts De Seine, Finace | 5000+ employees >1B | ... |
| ☐ American Express | Banking/Accounting/Financial | London, United Kingdom | 5000+ employees >1B | ... |
| ☐ Equifax | Banking/Accounting/Financial | London, United Kingdom | 5000+ employees >1B | ... |
| ☐ Diebold Nixdorf | Banking/Accounting/Financial | Middlesex, United Kingdom | 5000+ employees >1B | ... |
| ☐ Nomura | Banking/Accounting/Financial | London, United Kingdom | 5000+ employees >1B | ... |

VISUAL FILTERING SYSTEM AND METHOD

PRIORITY CLAIMS/RELATED APPLICATIONS

This application claims priority under 35 USC 120 and benefit to 35 USC 119(e) to U.S. Provisional Patent Application Ser. No. 63/452,759 filed Mar. 17, 2023, the entirety of which is incorporated herein by reference.

FIELD

The disclosure relates to a system and method for generating and displaying filters and filter results during a search process.

BACKGROUND

Currently, there are various different search engines that are used to perform searching on different types of information. One type of search engine is a web search engine like Google for consumers that permits the consumer to search the world wide web for news, images, videos and the like. Another type of search engine is a commercial/business search engine that is used to search a particular type of content or documents based on a particular corpus of documents. For example, the United States Patent and Trademark Office ("USPTO") has several search systems that allow examiners at the USPTO or the public to search published patent documents for different terms in different fields of the corpus of published patent documents. These more specialized search engines often allow the user to use filtering criteria to limit the scope of the search. For example, the USPTO search engine allows a user to limit the search to "Assignees" with a particular name or to a particular term that appears in the claims portion of the published patent applications. Furthermore, using Boolean search logic, the USPTO search system allows multiple different filters (search filtering criteria) to be used to reduce the scope of the search (such as patents with the term "engine" in the claims and assigned to Company X and published/issued before 1995). However, using Boolean search logic is challenging and very complicated unless the user has had experience with Boolean search logic.

In today's specialized search engines (like the USPTO search system example), when a user is performing a search with many filtering criteria (known as facets), the user must define the value(s) for each filter using a complicated interface. As a result, creating an advanced search query with multiple filtering criteria is complex, not convenient and not efficient. The USPTO search system interface is a good example of the complicated interface. If the user needs to add new filters or tighten the scope of an existing filter, the user cannot see or anticipate expected results of the existing search before changing the filtering criteria (select a new filter and/or tighten an existing filter criteria) which makes the process to determine a correct set of filtering criteria challenging as it requires back and forth iterations on the changing filtering criteria.

In the traditional and known search interfaces with multiple filters, users cannot anticipate the expected result before selecting a new filter, making the process slow and cumbersome with back and forth iterations on filters. The process is time consuming and makes the creation of an advanced search not intuitive.

In the Sales and Marketing industry, one professional networking company helps users selecting relevant values for filters by showing a counter on suggested values when the user is opening a specific filter, but still does not allow users to have a quick way to get an overview of all filters values and an understanding also how the matching results are distributed. In the retail industry, faceted search is used sometimes to filter products and this type of search shows values for different types of filters, sometimes with counters for each filter. For example, for clothes there may be filters (facets) for gender, size, price, color, material, etc. This helps users quickly select a few filters and view matching products. However, these faceted searches still do not allow users to have a quick way to get an overview of all filters values and an understanding also how the matching results are distributed.

It would be desirable to provide a way to provide an overview of search landscape and the filtering criteria that is not available with current systems which would reduce the challenging search process and it is to this end that the disclosure is directed.

BRIEF DESCRIPTION OF THE DRAWINGS

FIG. 9 illustrates a user interface of the service for browsing matching contacts and/or companies;

FIG. 12 illustrates a user interface of the service when no filter is selected;

FIG. 19 illustrates a user interface of the service when the user browsed matching companies to validate results; and FIG. 20 illustrates a user interface of the service when the user selects contacts to sends the contacts to sales representatives.

DETAILED DESCRIPTION OF ONE OR MORE EMBODIMENTS

The disclosure is particularly applicable to sales and marketing system for lead and targets that has a visual filter feature and it is in this context that the disclosure will be described. It will be appreciated, however, that the system and method has greater utility since it can be implemented on any system that performs searches in which the visual filter feature would be beneficial. For example, the visual filter feature may be implemented on any faceted search system in any industry. The visual filters feature allow users to get an overview of the data that they can search and filter, allowing them to size the change of the number of matching results before selecting or deselecting any visual filter. The process of selecting or deselecting a filter may be collectively known as filter activation (or activating the filter) in which the filter or filters being applied to the corpus is changed.

The visual filters feature may also generate a global value when no filters have been activated by a user so that, even without selecting a value in a type of filter, the user can get a quick understanding of what the matching results are. Seeing the distribution of values in a type of filter helps the user understand quickly what the results look like if/when the filter is implemented. This allows the user to view the preliminary results of the new filter and change/adjust the filter selection based on the preliminary results and before the time is spent to perform the search with the filter.

Figure 1:
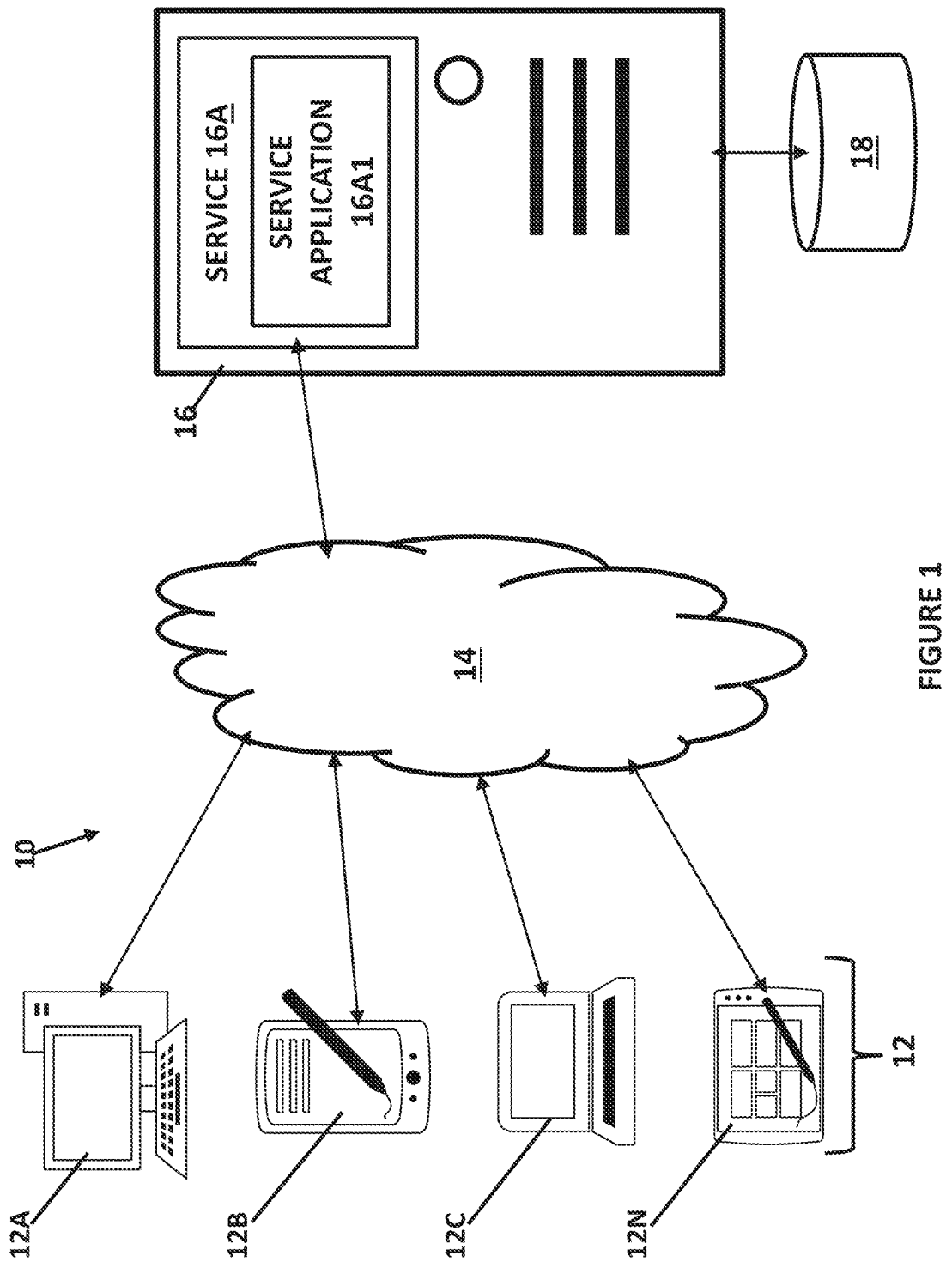
FIG. 1 illustrates an example architecture of a system that may include a visual filters feature.

FIG. 1 illustrates an example architecture of a system 10 that may include a visual filters feature. The system 10 may be any system in which it is beneficial or desirable to be able to perform filtering using the visual filters technique described above including a sales/marketing system or a search system. The system may have one or more computing devices 12 that connect to and communicate over a communications path 14 to a backend system 16. Each computing device 12 allows a user to communicate and interact with the system 10. In one implementation, each computing device 12 may use a known browser application to communicate and interact with the system 10 using a known secure or unsecure transfer protocol such as HTTP or HTTPS. Each computing device 12 may be a different type of processor based device that is capable of executing the browser application. For example, each computing device 12 may be a personal computer/desktop computer 12A, a smartphone 12B, such as an Apple iPhone or Android operating system (OS) based device, a laptop computer 12C and/or a tablet computer 12N.

The communications path 14 may be one or more different communication channels that use a secure or unsecure protocol to connect and communicate data. The communications channel may be a wireless network, a digital computer network, a cellular network, Ethernet, Wi-Fi, etc. The backend system 16 may be implemented as one or more computer systems that provide a service to each user, such as demand generation or a search capability, wherein a processor of the one or more computer systems may execute instructions to generate and provide the service to each user. For example, the backend system 16 may be one or more server computers, one or more cloud computing resources, etc. In a sales/marketing embodiment, the backend system 16 may operate a service 16A wherein that service benefits from the visual filtering feature that is discussed below in more detail. For example, the service may be a marketing/sales service (used below as the illustrative embodiment) or a search service. The system 10 may also have a data store 18 connected to the backend system 16 that stores the user data for the service as well as the instructions/code that may implement the service 16A in a software implementation of the system. The service system 16A may also be implemented in hardware that performs the operations of the service. In one embodiment, the service 16A has one or more application programming interfaces (APIs) and may generate code that is communicated to each computing device 12 so that a browser application of the computing device 12 may render and display a graphical web page on a display of each computing device 12 to provide the service, etc. to each computing device 12. The service 16A further comprises a service application 16A1 that is executed by a processor of the backend system 16 and performs the operations that deliver the service to the user that may include a discovery process and a user interface/web page generation process.

Figure 2:
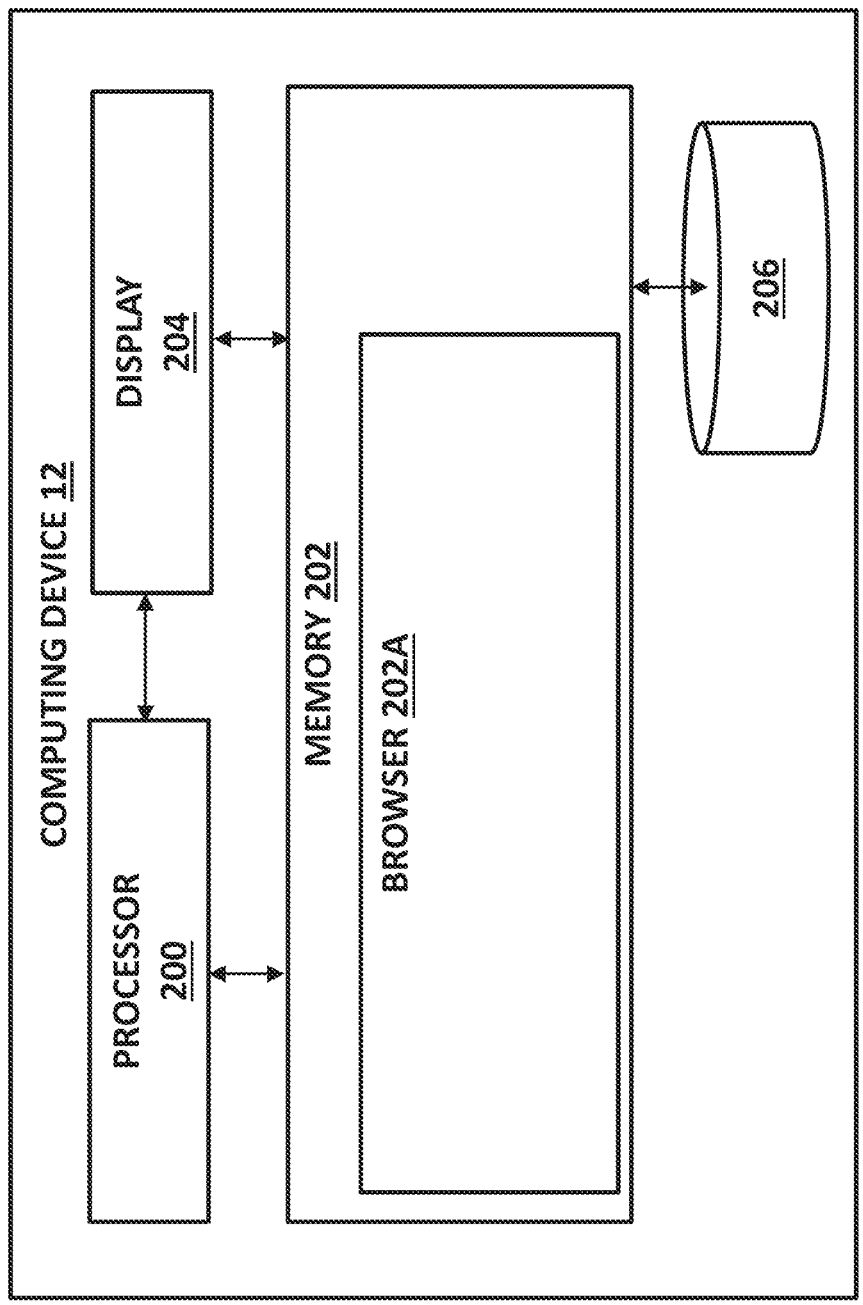
FIG. 2 illustrates an example of a computing device of a user that may be used with the system in FIG. 1.

FIG. 2 illustrates an example of a computing device 12 of a user that may be used with the system in FIG. 1. Each computing device 12 may have a processor 200, memory 202 and display 204 that are interconnected as shown in FIG. 2. The memory 202 may store a browser application 202A (having a plurality of instructions/code) that is executed by the processor 200 and thus allows each computing device to connect to and interact with the service 16A. For example, the browser application 202A may receive data and/or code from the service 16A and generate a web page that is then displayed to the user on the display 204. The computing device 12 may also have persistent storage 206 as is well known. The web page and its logic provides the user interface to the user with the visual filtering feature as described below.

Figure 3:
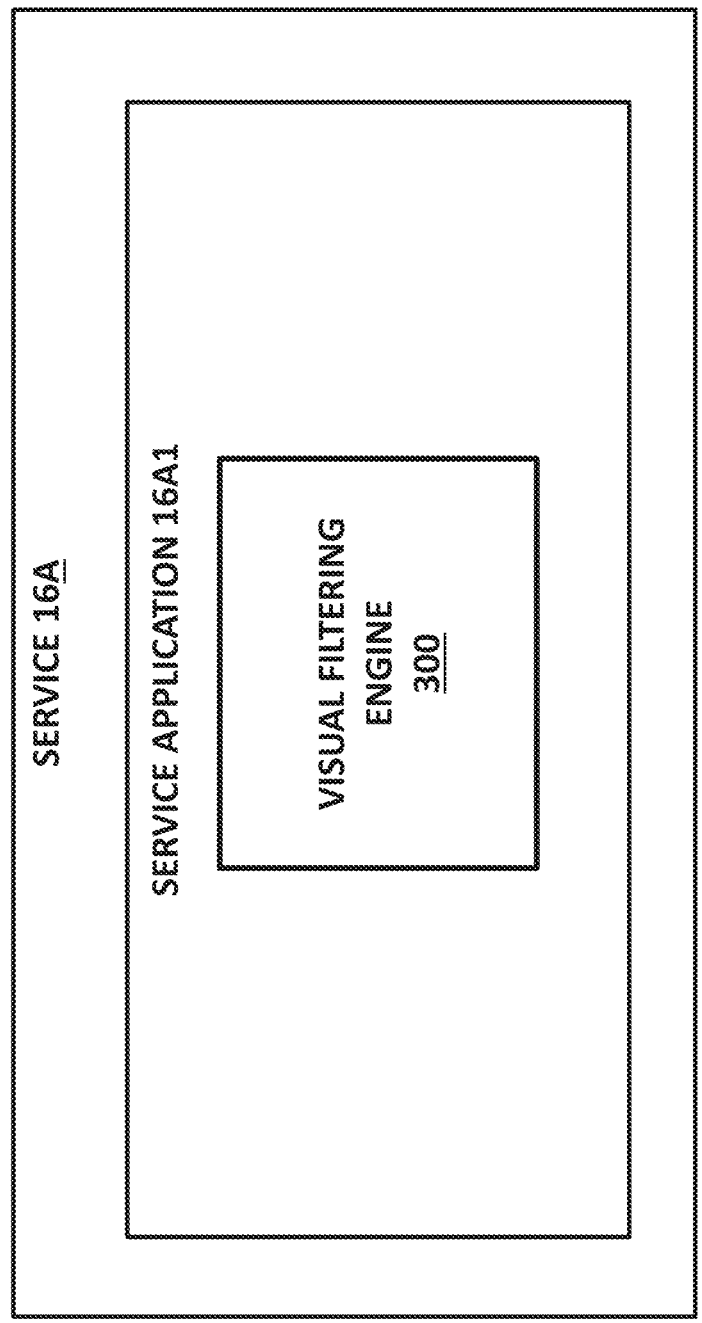
FIG. 3 illustrates more details of the service backend system in FIG. 1.

FIG. 3 illustrates more details of the service backend system 16A in FIG. 1. The visual filters are implemented by a combination of a service application 16A1 on the backend computer system 16A (implemented in the cloud vis AWS, Azure, etc.) and the browser 202A (of other front end application) on each user computing device 12 that connects to and exchanges data with the service application 16A1 and then generates and displays the user interface for the service (examples of which are shown in FIGS. 7-9 and 12-20 and described below). The service application 16A1 may include a visual filtering engine 300 that is implemented in a plurality of lines of computer code/instructions and executed by a processor of the backend computer system to perform the operations and generate the user interfaces for the visual filtering feature. As discussed above, the visual filtering feature may be integrated into any service with a search functionality in which it is desirable to provide the benefits of the visual filtering engine.

Figure 4:
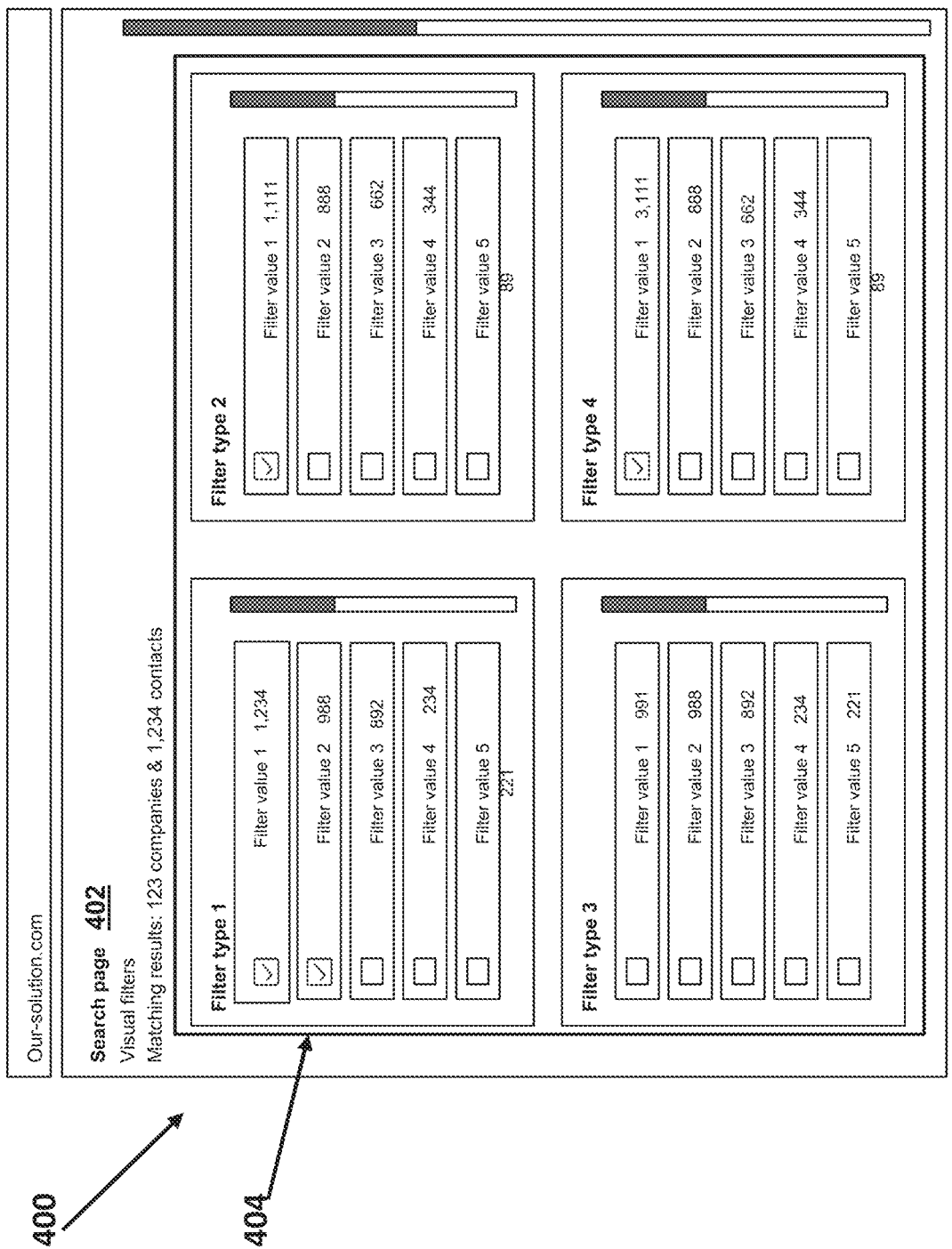
FIG. 4 illustrates a user interface of a search system that has the visual filters feature.

FIG. 4 illustrates a user interface 400 of a search system that has the visual filters feature. Visual filters are a search interface displayed in the browser or any frontend application available to the user. The interface 400 may appear on a search page user interface 402 to allow the user to add/remove filters from the search criteria. The user interface 400 may further have an interface portion 404 with one or more filter types (such as the four filter types shown in FIG. 4). The interface portion 404 thus provides a combination of different types of filters, each displaying filter values (filter value 1 for type 1, filter value 1 for type 2, etc.) that the user can select or deselect as shown in FIG. 4. The search user interface 402 may have a global matching results counter for the companies (123) and contacts (1234) (when the service is a sales and marketing service such as a lead generation system). The portion 404 for each type of filter may include a counter on each value of each filter type (such as, for example, 1234 matches for filter value 2 of type 1, 988 matches for filter value 2 of type 1, 892 matches for filter value 3 of type 1, 234 matches for filter value 4 of type 1 and 221 for filter value 5 of type 1, etc. as shown in FIG. 4). The filter value counts inform the user on how many items (companies or contacts) are matching each specific filter value (including both selected and unselected filter values) A global counter (the matching results described above) shows the number of companies and contacts that are matching the current search composed of all selected values of filters. Thus, the visual filter engine performs the searches with each filter value so that the counts may be displayed to the user.

Figure 5:
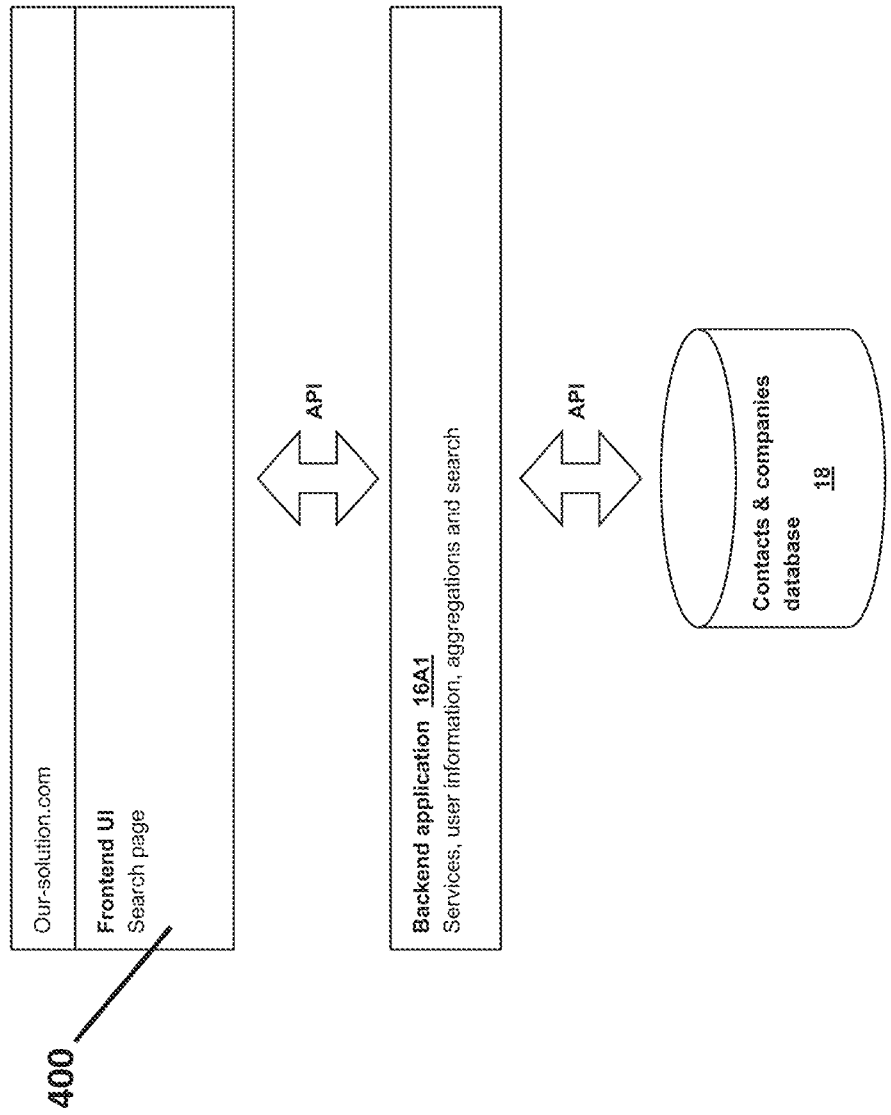
FIG. 5 illustrates more details of the service backend elements of the backend system in FIG. 1.

FIG. 5 illustrates more details of the service backend elements of the backend system 16A in FIG. 1 that includes the store 18 that stores contacts and company database(s) for the sales and marketing service searching and the backend application 16A1 that provides the services, user information, aggregations and searches (including the pre-searches for each visual filter value. The system may have a frontend user interface 400, such as a search page, that may be displayed in the browser. This frontend is connected to the backend of the application via an API. The API serves the information needed to list the different types of filters, all values and counters for these filters and the number of currently matching companies and contacts.

Figure 6:
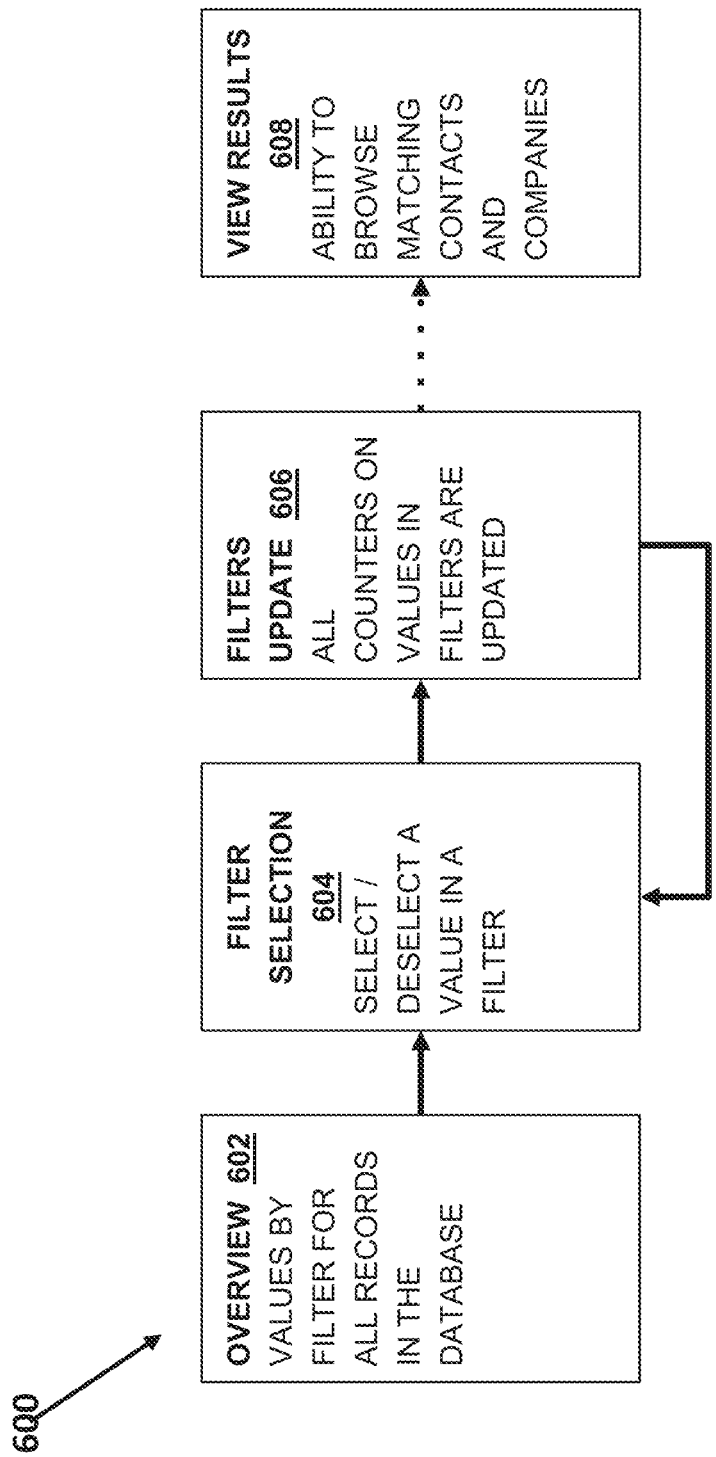
FIG. 6 illustrates a method for visual filtering.

FIG. 6 illustrates a method 600 for visual filtering. The method 600 may be implemented using the system in FIGS. 1-3 and the visual filter engine 300 is a plurality of lines of computer code/instructions executed by a processor of the backend computer system and the frontend application/browser executed by a processor of each computing device. The method 600 may be implemented as a plurality of lines of computer code/instructions executed by a processor of a service computer system that provides a service or services to the user and takes advantage of the visual filtering. The method begins with an overview process 602 in which the records in the store (such as a database) of the system are accessed and values by filter type for all of the records are determined. This process then allows the visual filter user interface to prepare the preliminary count numbers for each filter and thus display those counts even before the user has selected any particular filter value or type of filter. The method may then display the filter value options to the user who then selects/deselects one or more filter values from the filter types (604). The user can select no filters and then will see the overall counts for the items in the database. Once at least one filter value for one type of filter is selected, the method performs a filter update process 606 in which all counters on values in the filters are updated. The method then allows the user to browse the matching items in the store (608), such as contacts and companies in a sales and marketing service example of a system that uses the visual filters.

Figure 7:
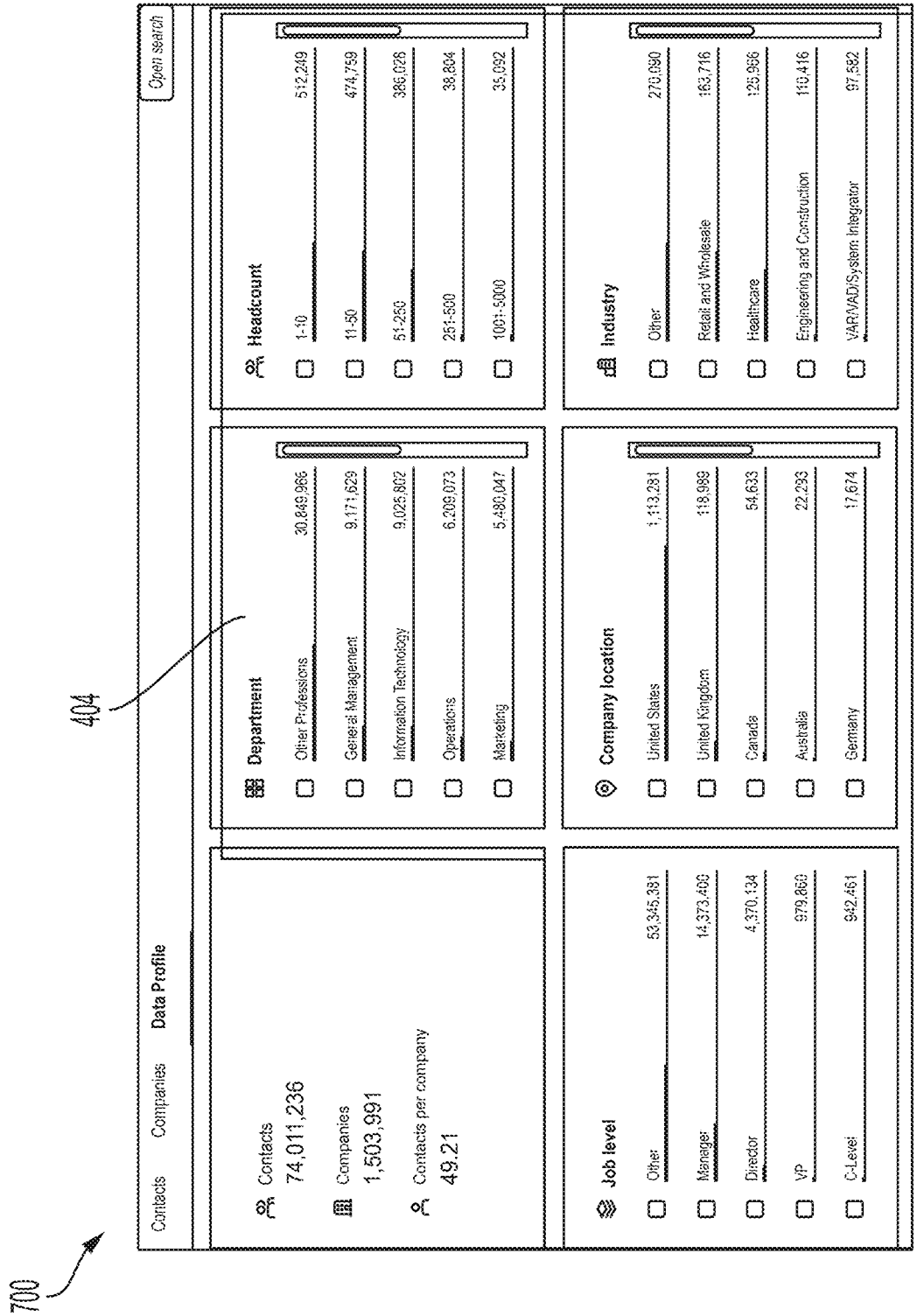
FIG. 7 illustrates a user interface of the service when no filter is selected.
Figure 8:
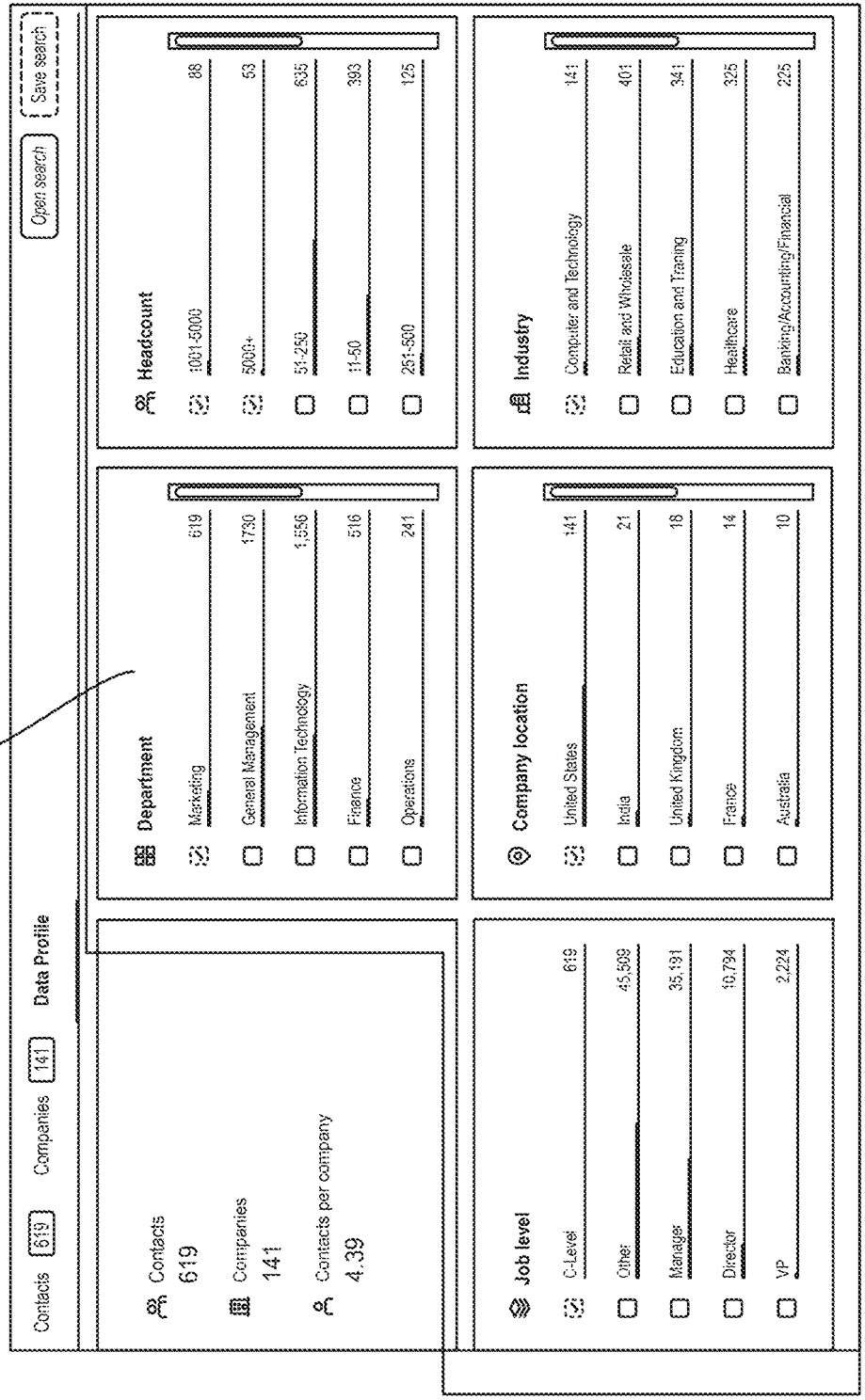
FIG. 8 illustrates a user interface of the service when one or more filter(s) are selected and values and counters are updated.
Figure 9:
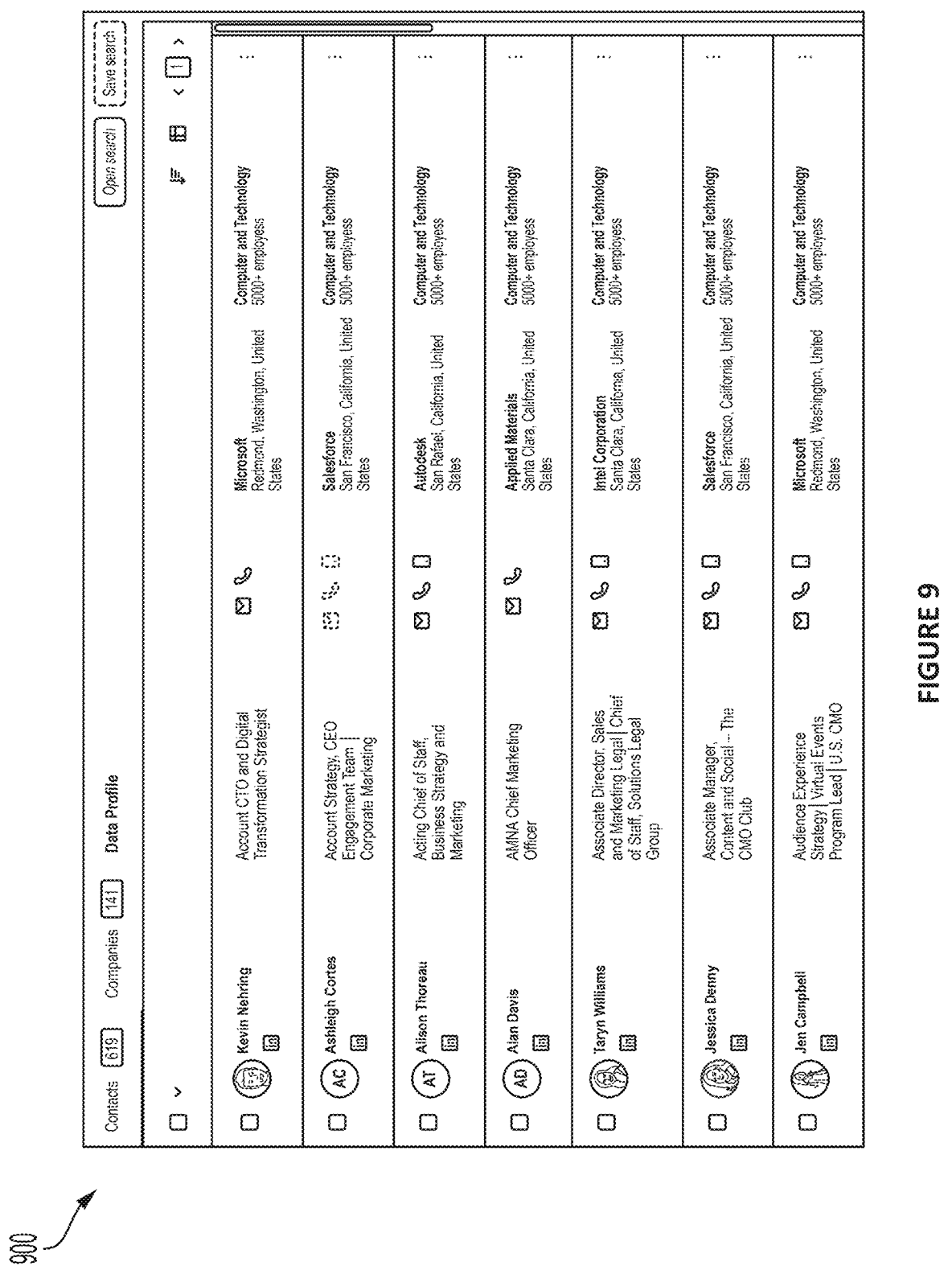

FIG. 7 illustrates a user interface 700 of the service when no filter is selected wherein the service is a sales and marketing application to identify targets for sales and marketing wherein the user interface is a search page. The user interface has the global counters showing the total number of contacts and companies in the database (the item in the database that can be searched using the visual filters) and the interface portion 404 with the different types of filters and the different filter values that may be selected by the user. In this example of a sales and marketing service, the filter types may include a department type, a headcount type, a job level type, a company location type and an industry type. Each set of types of filters may include the one or more filter values wherein the values can be alphanumeric and wherein the values for each type of filter are tied to that filter type. Due to the visual filter feature, each filter value of each filter type may have its own count (due to the overview processing 602) so that the user, even when the user has not selected any filter or filter value, can view the preliminary count numbers (a number of matches of items in the database) for each filter value. FIG. 8 illustrates a user interface 800 of the service when one or more filter(s) are selected and values and counters are updated. As shown in FIG. 8, the user has selected, in this example, one filter value from each filter type that causes all of the counters to be updated for each filter value for each filter type and the global counters based on the visual filtering engine 300 and method 600. In the sales and marketing example, the service allows the user to browse the matching items (619 contacts and 141 companies which are the same global numbers in FIG. 8) as shown in FIG. 9 that shows the user browsing the contacts. This user interface allows the user to drill down on each item that matched the filters.

In FIGS. 7-8, the values for the different filter types are alphanumeric. However, the visual display of each type of filter could be different. For example an interactive map could be used to display countries, or a pie chart, a word cloud, etc. from which the user can select the values of the filters. A key aspect of visual filters is that the user has to be visually informed of the number of (potential if not selected yet) matching results and be able to select or deselect a value.

The visual filters feature and functionality allows a user of the service to more efficiently decide a search strategy with filters to get the right items as part of the search results. In the sales and marketing example, the visual filters allow sales and marketing managers to efficiently size a target market. By visually having an overview of how the total market is distributed, the visual filters feature helps understand and refine an audience in a unique simple experience. Getting an overview and understanding of the market to go after without having to browse through all the companies and contacts to get an idea of what is matching allows Sales and marketing leaders to be more efficient and informed.

The visual filters feature may also be used in any other service or system in which a search of a large corpus of items is performed by the user and it is desirable to quickly determine a number of matching items based on different filter and filter values.

Figure 10:
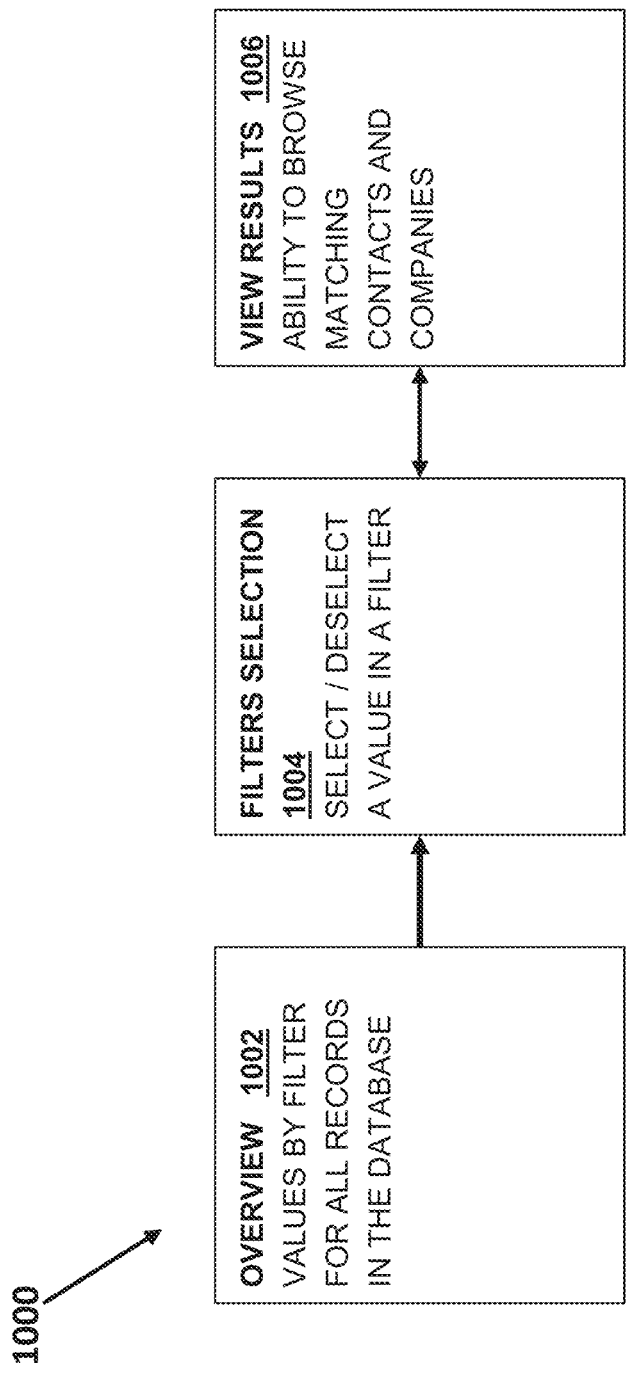
FIG. 10 illustrates further details of the visual filter engine shown in FIG. 3.
Figure 13:
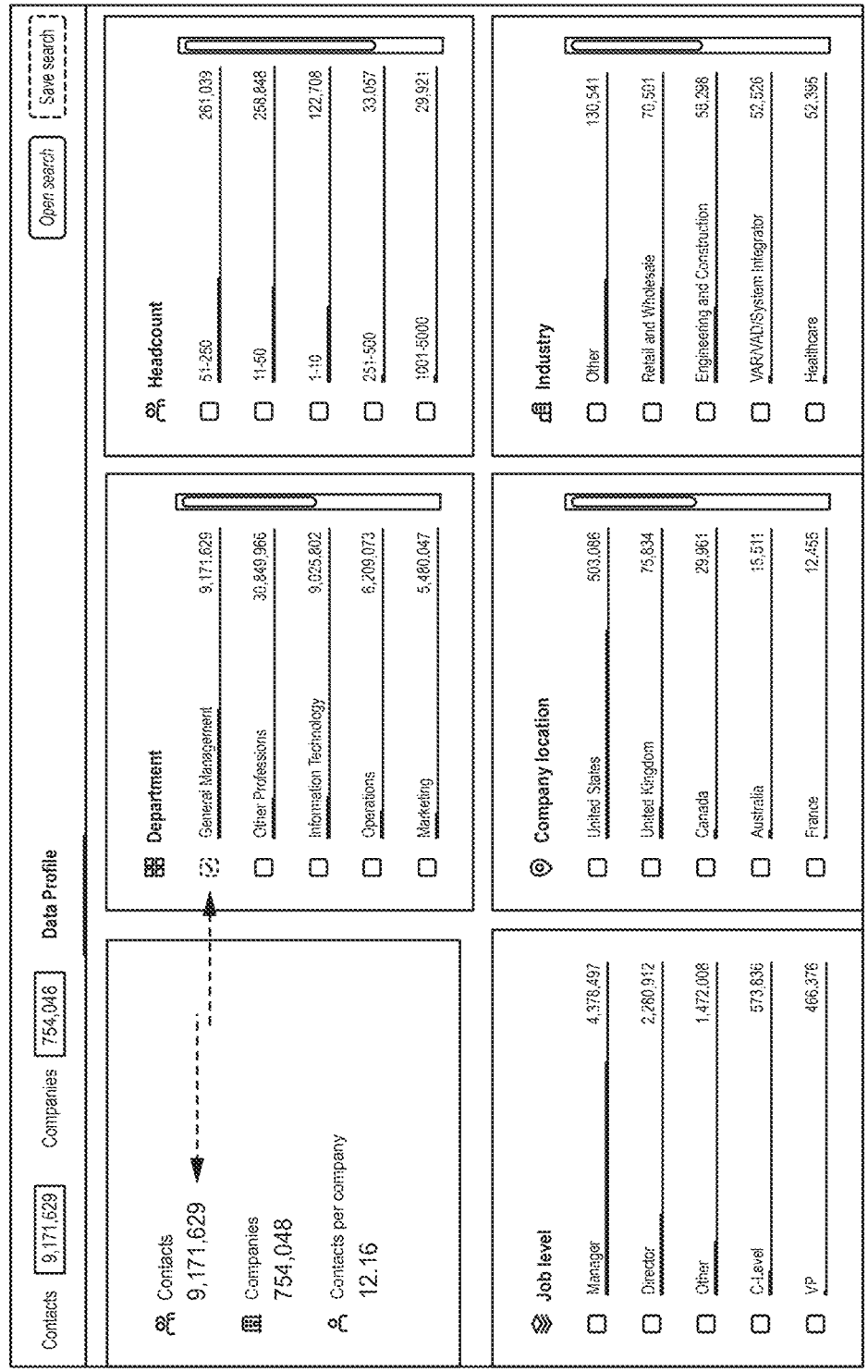
FIG. 13 illustrates a user interface of the service when a filter is selected.

FIG. 10 illustrates further details of the visual filter engine shown in FIG. 3 and an alternative method 1000 for visual filtering. As previously described, the method may have an overview process 1002 as described above. The user may then select/deselect a value in a filter (1004) (an example of which is shown in FIG. 13). The method may then provide the user with the ability to browse (1006) the matching items based on the selected/deselected filters. In the sales and marketing example, the user may browser contacts and companies.

Figure 11:
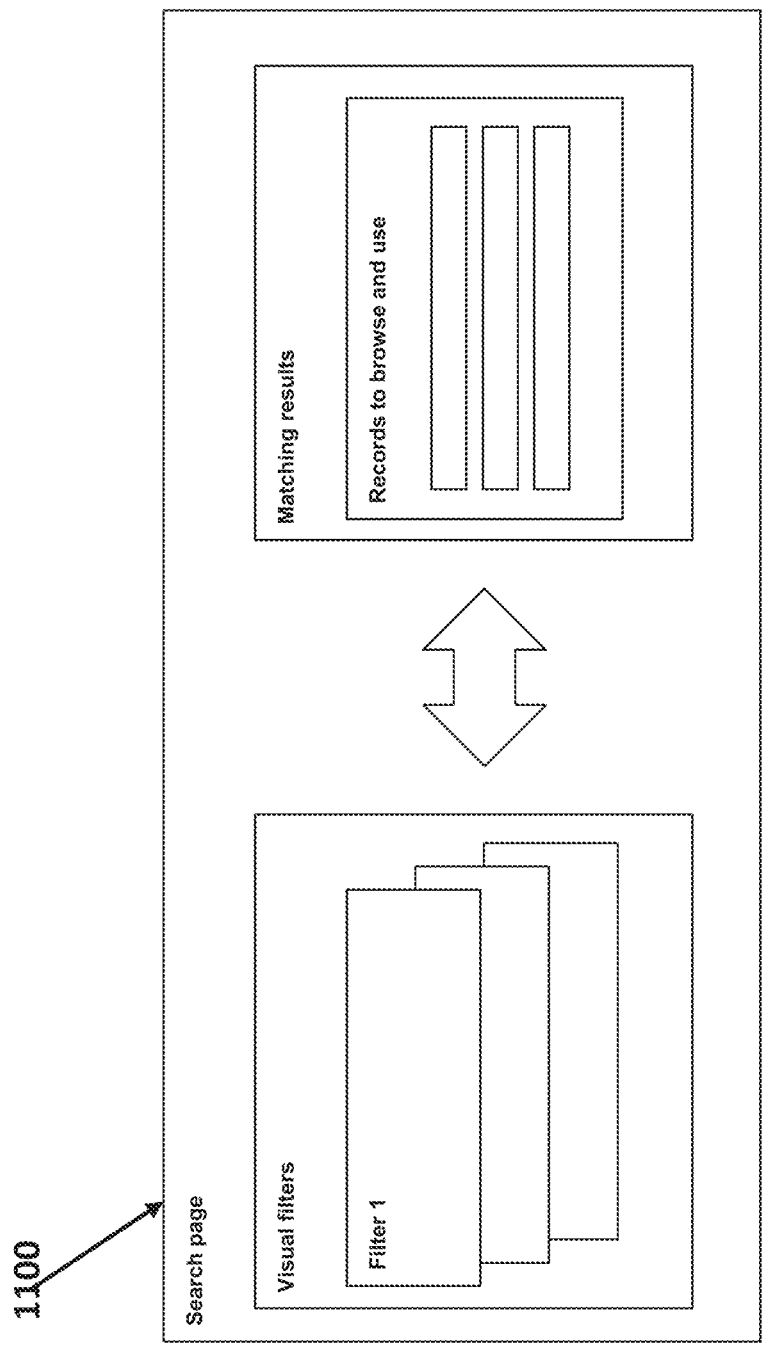
FIG. 11 illustrates an example of a user interface with a search page.

FIG. 11 illustrates an example of a user interface 1100 with a search page in which visual filters are with the ability to browse matching results at any time. In this embodiment, the user interface 1100 may have both the visual filters user interface from which the filters and filter values may be selected/deselected and the matching results user interface from which matched items may be browsed.

Figure 12:
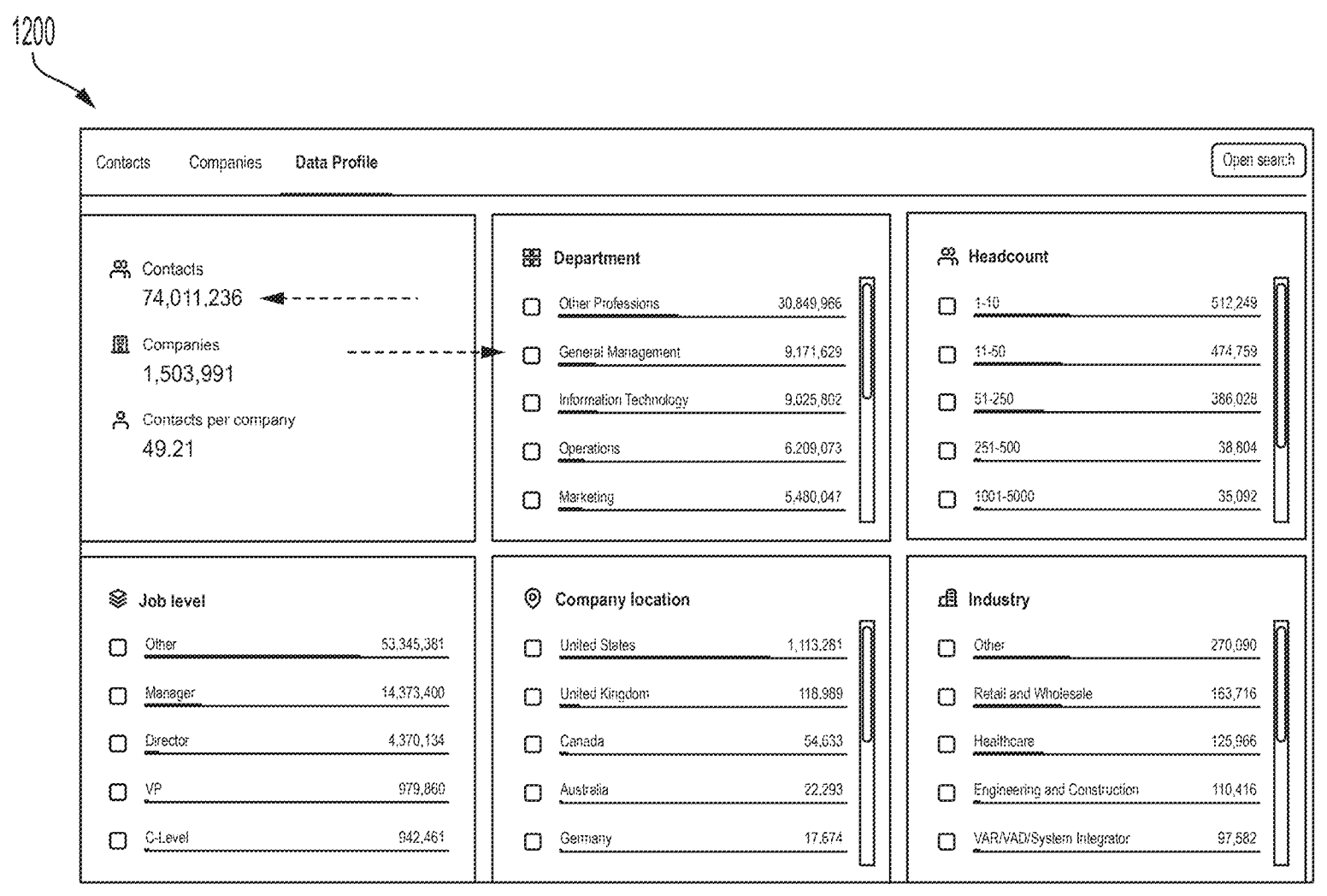

With the visual filters, when 1-n value(s) is (are) selected for a type of filter, more values can be selected to expand the current search. The user can see potential additional values to select and for each value a counter. This informs him on the number of additional matching companies or contacts (depending on the type of filter) that he will add to his results. FIG. 12 illustrates a user interface 1200 of the service when no filter is selected and the user interface displays the global counts (on the left side of the user interface), the different types of filters, the different values for each type of filter and the counts for each value of each filter type. In FIG. 12, note that when no filters are selected, the count for department type filter being "general management" is 9, 171,629 for all of the corpus of data in the database. As shown in FIG. 13, the "General Management" value for the Department type of filter has been selected so that the global number of contacts is the same as the count for the "general management" value.

Figure 14:
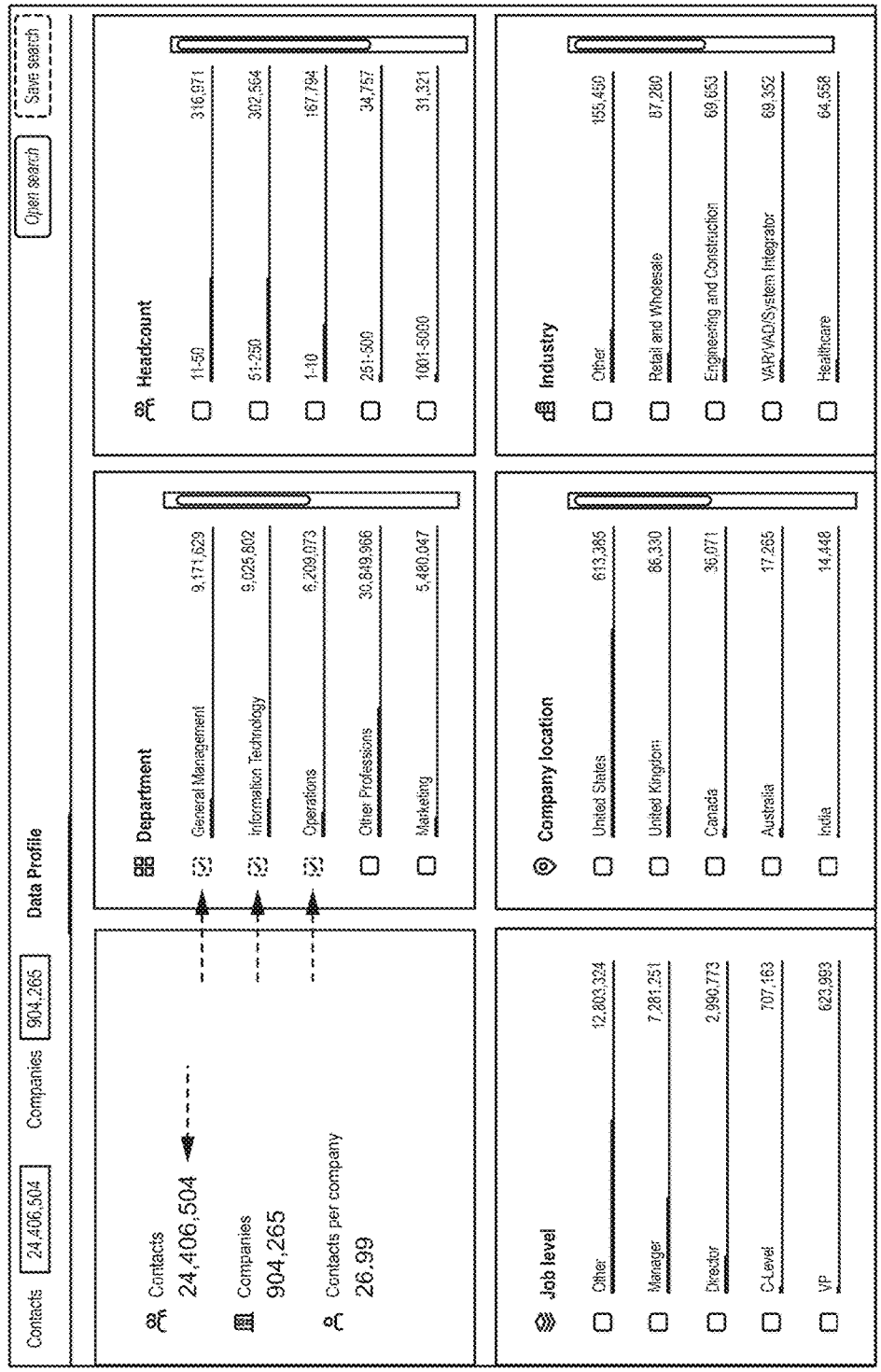
FIG. 14 illustrates a user interface of the service when additional filters are selected.
Figure 15:
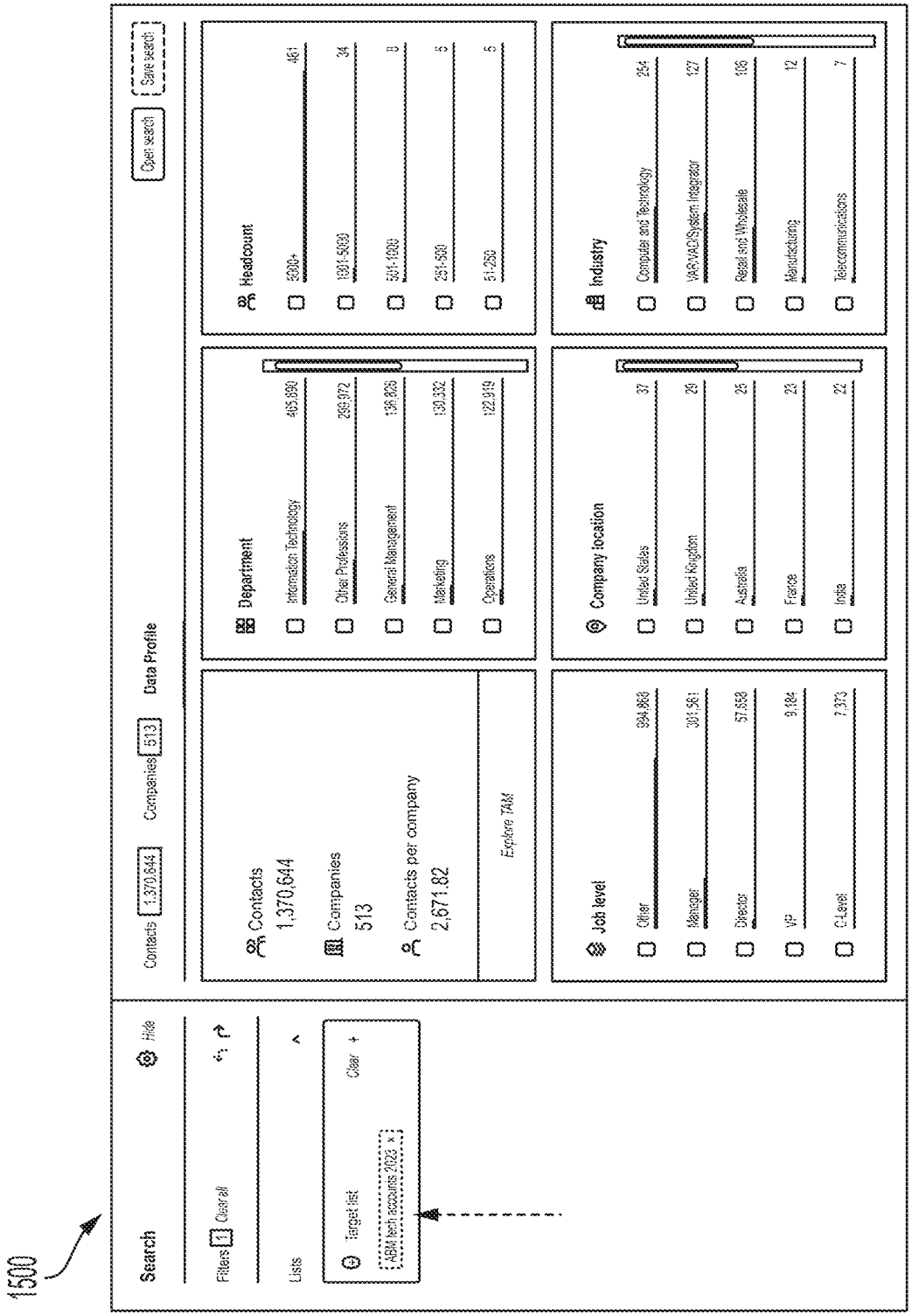
FIG. 15 illustrates a user interface of the service for understanding the market of a list.

In the visual filter system, when no value is selected for a type of filter, a first value can be selected to constrain the current search. The user then can see potential values to select and for each value a counter. This informs him on the number of matching companies or contacts (depending on the type of filter) that he will have as results for the sales and marketing embodiment of the system. As shown in FIG. 14, when additional filter values are selected, a user interface 1400 shows the three values for the department type of filter so that the counts for each of the values are combined together resulting in the sum of those counts being the global count for the search.

Figure 16:
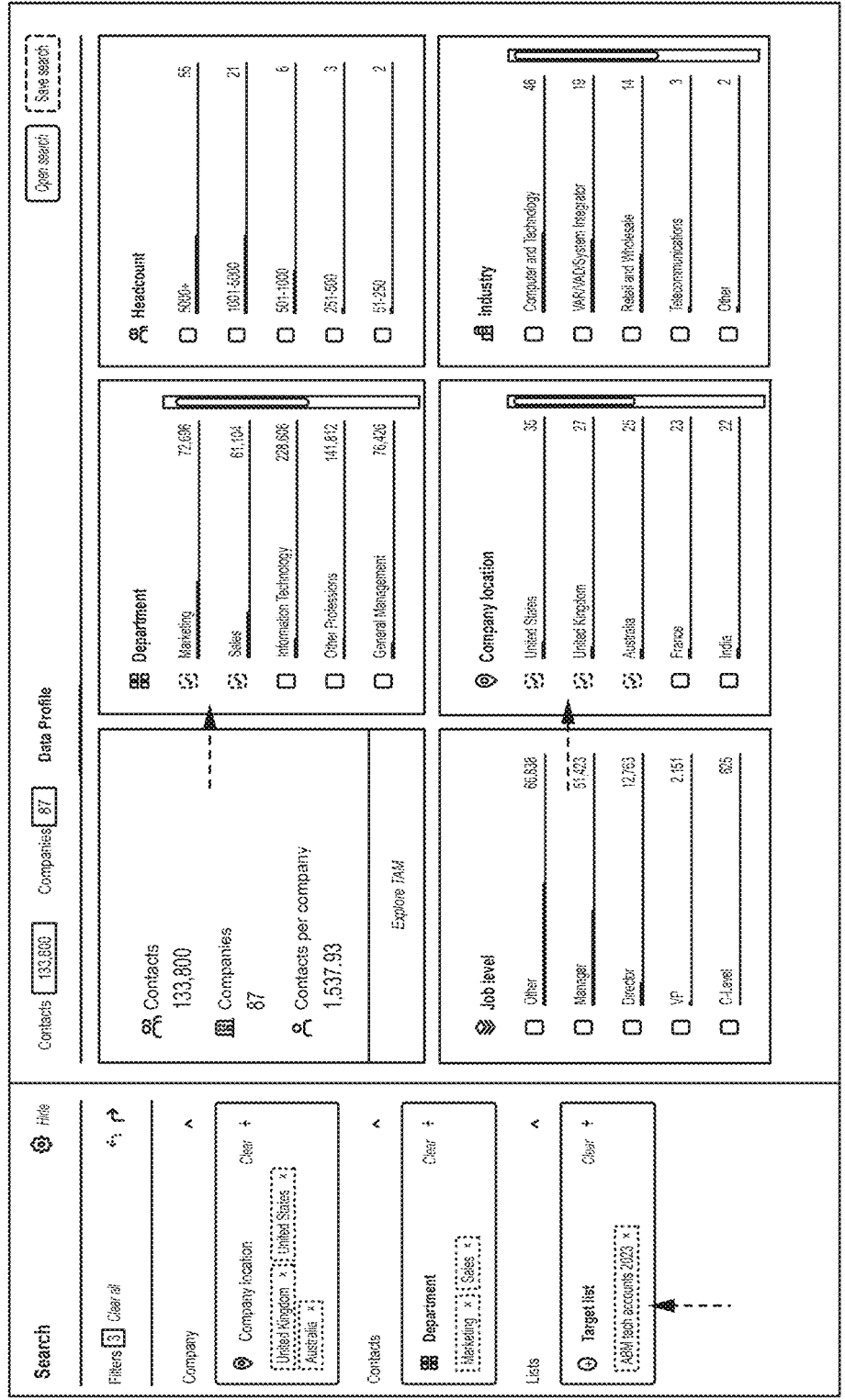
FIG. 16 illustrates a user interface of the service when the list in FIG. 15 is filtered down by the user.

A list of existing companies or contacts can be selected as a filter on top of the visual filters. In the example in FIG. 15, the existing contacts or companies list is the ABM tech accounts 2023 item shown in FIG. 15. When such a list (or several) is/are active, visual filters display by default how the companies and contacts from this list are distributed on the values of the different filters and values as shown in the line underneath each value. For example, the value 5000+ for headcount filter shows that most of the 481 matches are from the existing list. This helps users understand the type of companies and contacts contained in the market of this existing list. Looking at these ingredients the user can get a quick understanding of the profile of this market and can select additional visual filters to filter down this list as shown in FIG. 16 and look at specific companies or contacts.

Sales Leader Example

Figure 17:
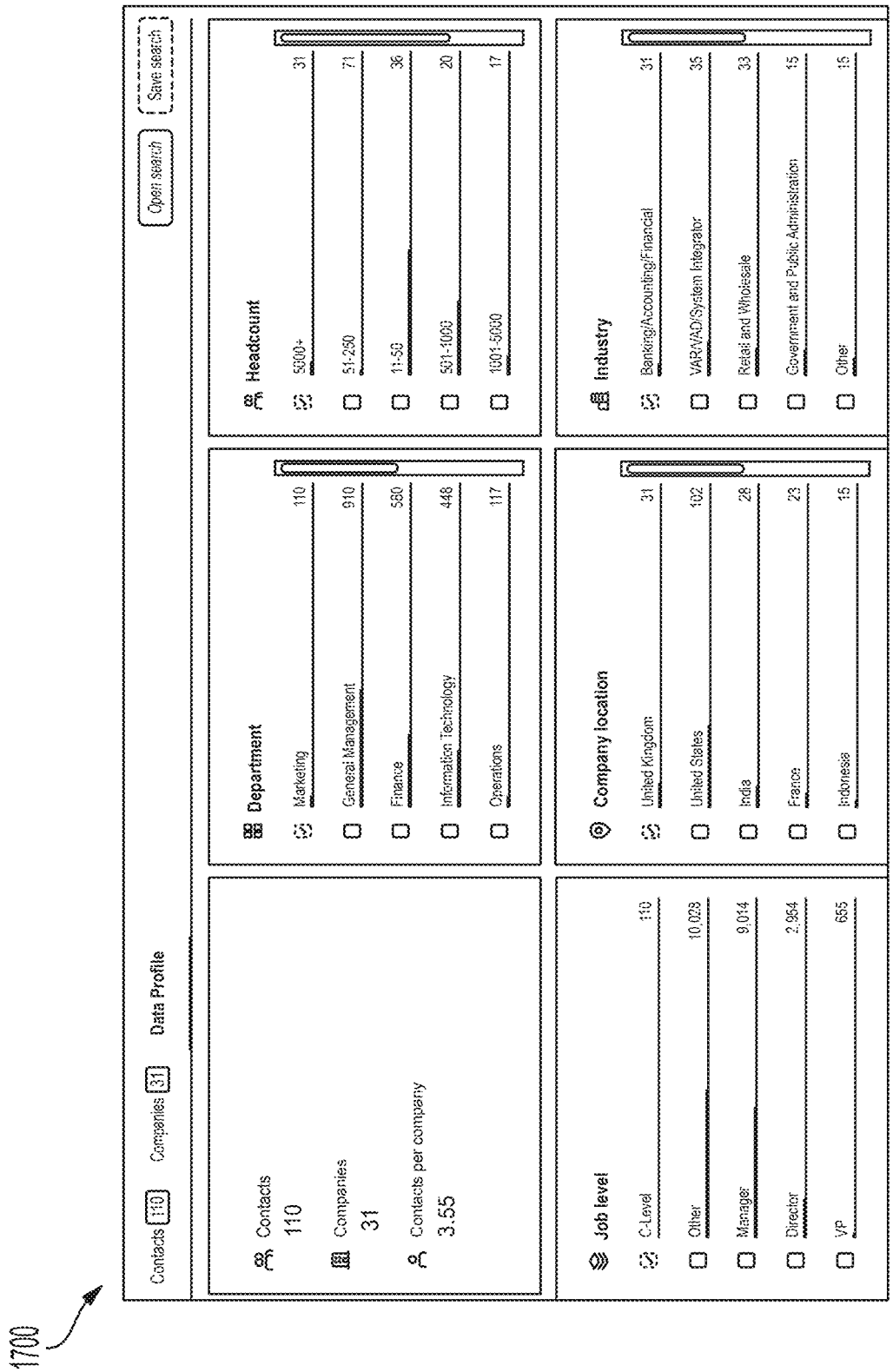
FIG. 17 illustrates a user interface of the service when a user is exploring a market to identify targets.
Figure 18:
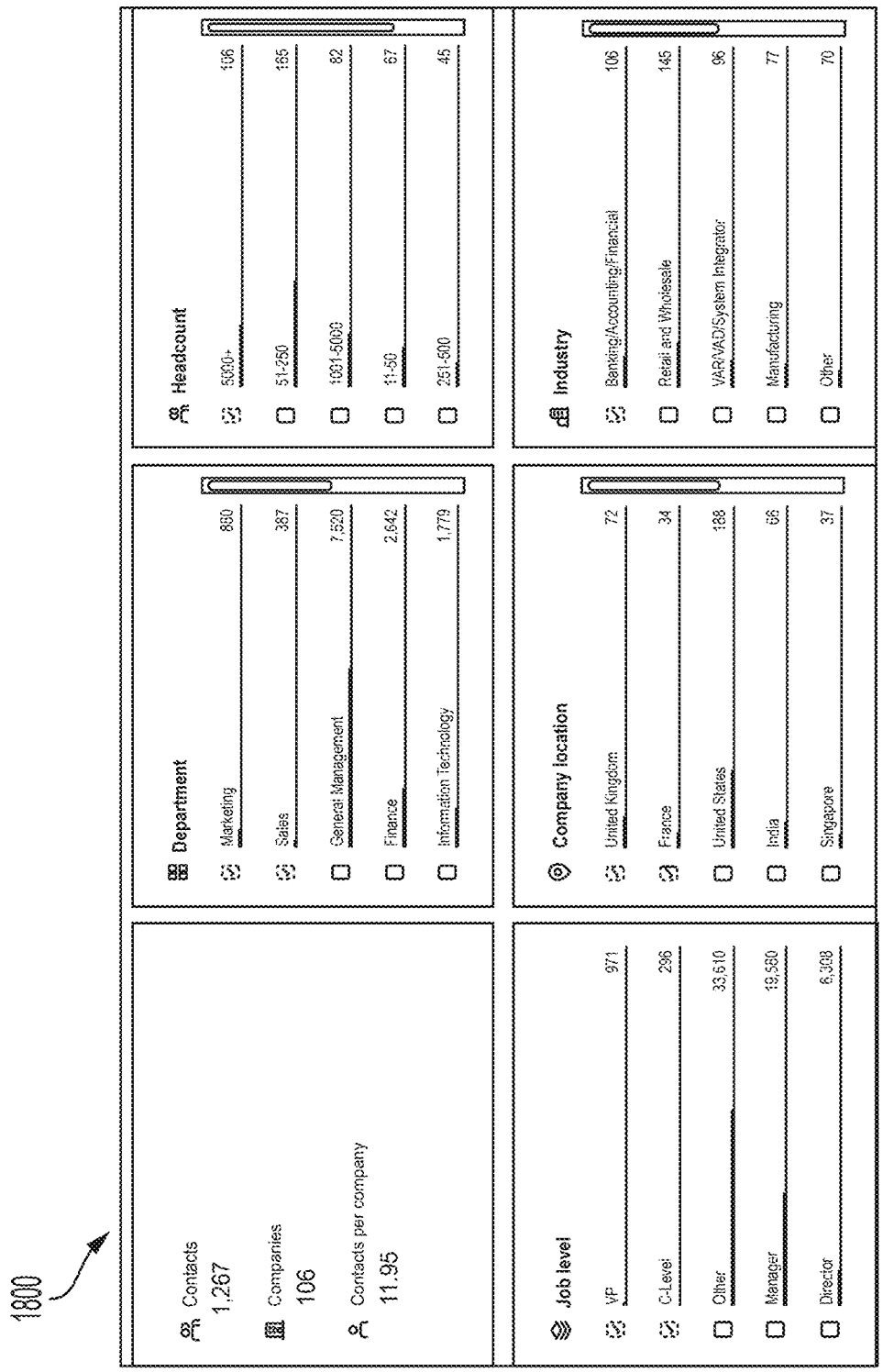
FIG. 18 illustrates a user interface of the service when the user is continuing to explore the market.

FIG. 17 shows an example of a Sales leader exploring the market and looking for companies to target. The user is exploring large banking companies in the UK and focusing on C-level executives working in the Marketing department to reach out to as shown by the selected filters and values. As shown in FIG. 17, the visual filter reduces the total number of companies to 31 and the total number of contacts to review to 110. As shown in FIG. 18, the user is continuing to explore the potential market and expanding it to the Sales department, also including VPs and companies located in France in addition to the UK based on the additional filters and values selected by the user. FIG. 19 shows a user interface 1900 in which the user browses the matching companies to validate results. FIG. 20 is a user interface 2000 that is displayed when the user selects contacts to reach out to and can send these contacts to his sales reps.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
    retrieving, from a data store, a corpus of data having a plurality of items;
    providing, by a computer system having a visual filter element, a plurality of filter types for the corpus of data with each filter type having a plurality of filter values;
    generating, by the computer system having the visual filter element, a numerical value for each particular filter values of each filter type, wherein the numerical value for each filter value indicates a number of items in the corpus of data that matches the filter value;
    generating, by the computer system having the visual filter element for the corpus of data, an initial global value that is a numerical value indicating all of the plurality of items in the corpus of data;
    activating, by the computer system having the visual filter element, one or more of the filter values from the plurality of filter types;
    generating, by the computer system having the visual filter element, a local value for each of the filter values for each of the filter types based on the activated filter values and an updated global value indicating items in the corpus of data that match the combination of one or more activated filter values; and displaying, on a display of the computer system, a search user interface that displays the local value for each filter value and the updated global value.

2. The method of claim 1 further comprising displaying, on the display of the computer system, the local value for each filter value of each filter type and the global value before any of the filter values are selected.

3. The method of claim 1 further comprising viewing, on the display of the computer system, the items that matched the plurality of activated filter values.

4. The method of claim 1, wherein activating the one or more filter values further comprises one of selecting the filter value to reduce the items in the corpus of data that match the one or more filter values and deselecting the filter value to increase the items in the corpus of data that match the filter values.

5. The method of claim 4, wherein selecting the filter value of a particular filter type further comprises one of selecting an alphanumeric value, selecting a value on an interactive map, selecting a value on a pie chart and selecting a value in a word cloud.

6. The method of claim 5, wherein deselecting the filter value of a particular filter further comprises one of deselecting the alphanumeric value, deselecting the value on the interactive map, deselecting the value on the pie chart and deselecting the value in the word cloud.

7. The method of claim 1, wherein a search user interface displaying the plurality of filter types is displayed in a browser application.

8. An apparatus, comprising:
a computer system having a processor, a memory and a plurality of lines of instructions executed by the processor wherein the computer system is configured to:
retrieve a corpus of data having a plurality of items;
provide a plurality of filter types for the corpus of data with each filter type having a plurality of filter values;
generate a numerical value for each particular filter values of each filter type, wherein the numerical value for each filter value indicates a number of items in the corpus of data that matches the filter value;
generate, for the corpus of data, an initial global value that is a numerical value indicating all of the plurality of items in the corpus of data;
activate one or more of the filter values from the plurality of filter types;
generate a local value for each of the filter values for each of the filter types based on the activated filter values and an updated global value indicating items in the corpus of data that match the combination of one or more activated filter values; and
generate, on a display of the computer system, a search user interface that displays the local value for each filter value and the updated global value.

9. The apparatus of claim 8, wherein the computer system is further configured to display the local value for each filter value of each filter type and the global value before any of the filter values are selected.

10. The apparatus of claim 8, wherein the computer system is further configured to view the items that matched the plurality of activated filter values.

11. The apparatus of claim 8, wherein the computer system that activates the one or more filter values is further configured to one of select the filter value to reduce the items in the corpus of data that match the one or more filter values and deselect the filter value to increase the items in the corpus of data that match the filter values.

12. The apparatus of claim 11, wherein the computer system that selects the filter value is further configured to one of select an alphanumeric value, select a value on an interactive map, select a value on a pie chart and select a value in a word cloud.

13. The apparatus of claim 12, wherein the computer system configured to deselect the filter value is further configured to one of deselect the alphanumeric value, deselect the value on the interactive map, deselect the value on the pie chart and deselect the value in the word cloud.

14. The apparatus of claim 8, wherein the computer system configured to generate the search user interface is further configured to display the search user interface in a browser application executed by the computer system.

* * * * *